Patented May 1, 1928.

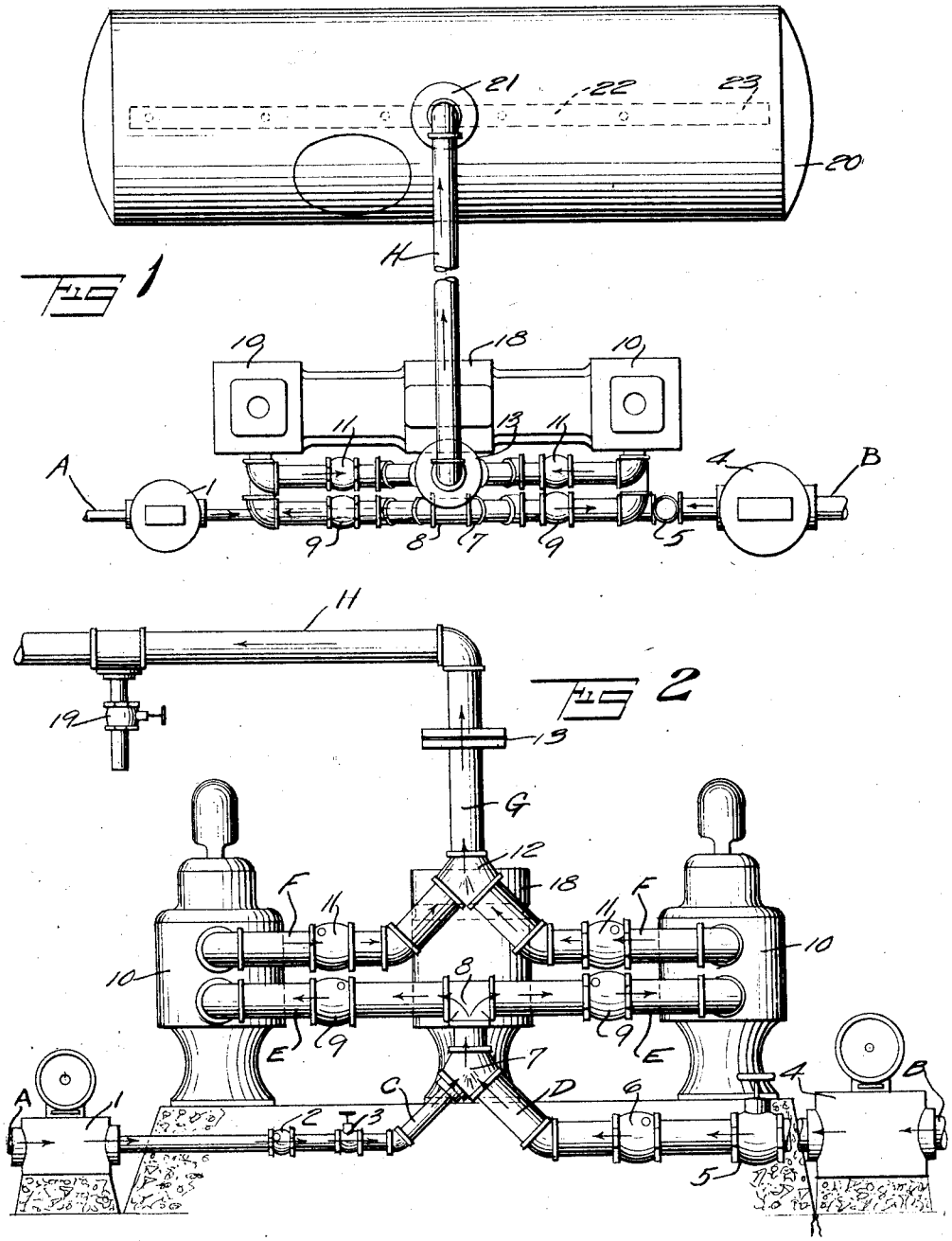

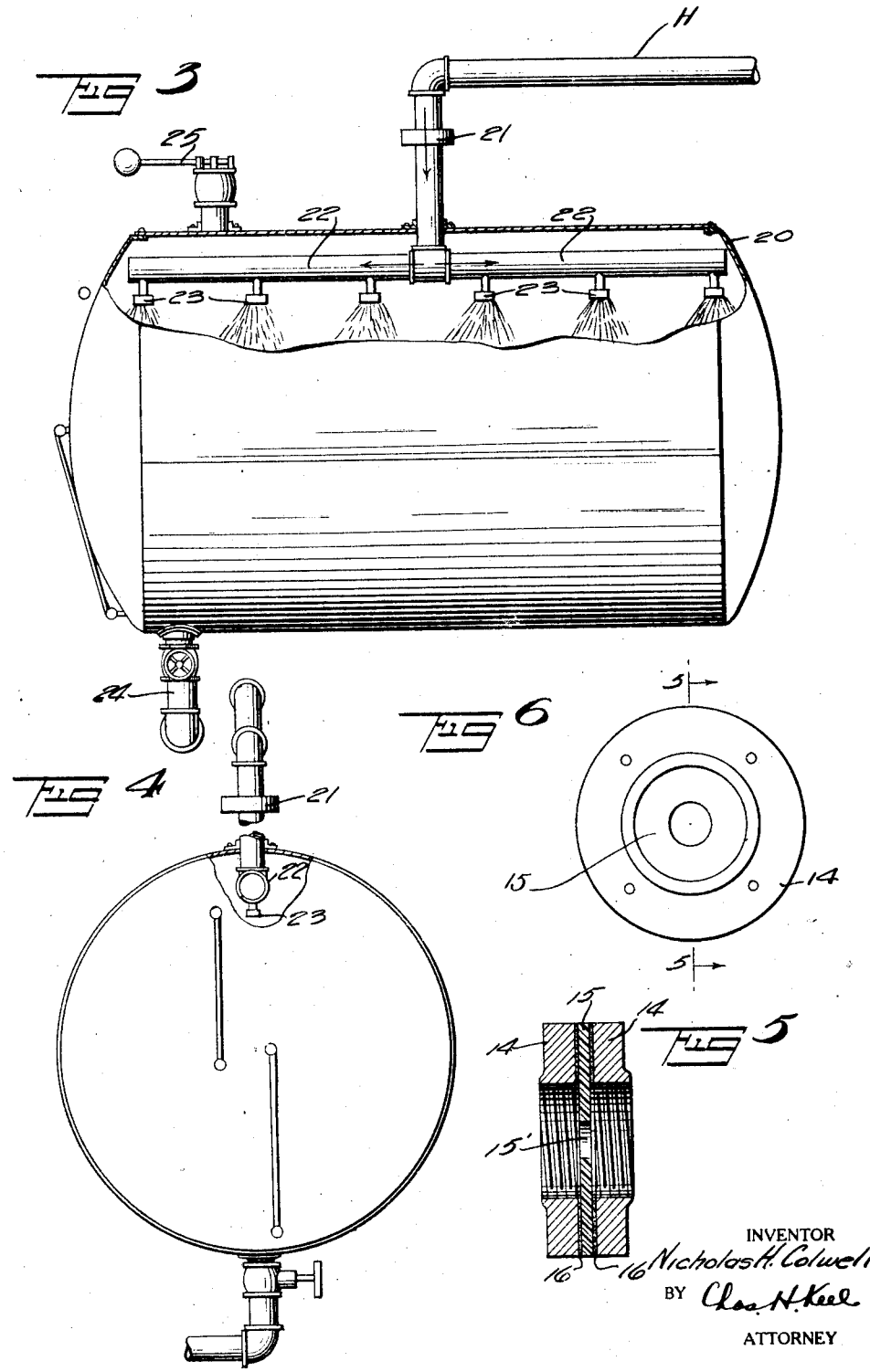

1,668,104

UNITED STATES PATENT OFFICE.

NICHOLAS H. COLWELL, OF NEW YORK, N. Y.

APPARATUS FOR TREATING AND COMBINING HYDROCARBON LIQUIDS AND GASES AND OTHER LIQUIDS AND GASES.

Application filed April 29, 1924. Serial No. 709,752.

This invention relates to a new and useful process and apparatus for treating and constructively combining any two or more of the liquid or gaseous hydrocarbon fractions or distillates with each other or in combination with any other kindred liquid or gaseous substance or substances.

The object of the invention is to treat and constructively reconstruct and combine by conversion with or without heat through the application of pressure hydrocarbon liquids and hydrocarbon gases and/or other liquid substances and gases into a composite product of a practical stable consistency and of any predetermined description and gravity.

The materials used in my new transforming or combining process may be any of the liquid petroleum hydrocarbon fractions whether volatile or nonvolatile; any of the volatile hydrocarbons such as natural or casinghead gasoline; the hydrocarbon gases such as natural gas and casinghead gas, and also uncondensed hydrocarbon still gases, or any other fluid or gaseous substance or any combination thereof suitable for the purpose.

In carrying out my invention I select and employ suitable hydrocarbon liquids and gases or both liquids and gases depending somewhat upon the ultimate result desired and subject such products to be treated and combined whether in the liquid or gaseous state or both to a succession of commingling, churning, impact, compression, expansion, gasification and condensation under pressure treatments whereby I have found that two or more different hydrocarbon substances may be reconstructively converted and combined into a practically homogeneous compound of a predetermined specification and gravity. For example, I have succeeded in so commingling and combining two or more suitably selected hydrocarbon fractions of distinct and different characteristics as to boiling points into a single homogeneous compound having a practically uniform range of boiling points and capable of distilling off at ascending boiling points that will chart practically a straight line graph in contrast to irregular corresponding graphs of the hydrocarbon fractions employed prior to treatment.

This process is conceived and the apparatus designed to thoroughly commingle the substances under treatment whether liquid or gaseous or both; to energize and disassociate the subtances by means of both mechanical and chemical power and pressure; to further disassociate and break up the heavier oils and substances by subjecting them to a powerful impact by means of mechanical power in combination with expanding gases resulting in both chemical and physical changes and in converting the heavier oils and substances into lighter oils and substances which when so converted more readily unite and combine with the more volatile hydrocarbon substances; to re-commingle and re-unite the disassociated particles by pressure and mechanical means; and finally by conversion to reconstructively combine and unite products in process of treatment into a practically homogeneous compound of any predetermined gravity capable of distilling off at ascending boiling points that will chart practically a straight line graph.

For a better understanding of my invention including the features above indicated generally and others which will hereafter appear reference may be had to the accompanying drawings which will illustrate one embodiment of my invention but it is understood that these drawings are for illustration only, that my invention is capable of embodiment in other apparatus and that the novel method or process is not limited to any one specific apparatus.

Referring to these drawings Fig. 1 shows a ground plan view of the present illustrated embodiment of the apparatus; Fig. 2 a side elevation of a portion of sub-elevation; Fig. 3 a side view of a pressure tank, with certain parts broken away, forming a part of the apparatus; Fig. 4 an end view thereof; Fig. 5 a section of an expanding orifice member one or more of which may be employed in my apparatus, and Fig. 6 is an end view of a coupling therefor.

I have illustrated herein my invention as applying to the commingling of two or more separate and distinct hydrocarbon liquids or gases or hydrocarbon mixtures and to the treatment of the commingled mixture thus obtained to produce an ultimate practically homogeneous product. The products to be treated are introduced under pressure respectively through the pipes A and B in the relative quantities desired according to the character of the products to be treated and are carried through the angle pipes C and D into an impact chamber 7 where the two columns of products are caused to meet at an angle and impinge on each other with considerable impact. The resulting commingled product thus obtained then passes from the impact chamber 7 into the T 8 where it divides and is drawn into a pair of pumps or pump cylinders 10 through intakes E. Here the mixture is subjected to a churning treatment by the power plungers and forced under considerable pressure through the outlet into an impact chamber 12, the two streams meeting with powerful impact at an angle through the angle pipes indicated. From the impact chamber 12, the product under treatment, now in a single stream or column, is forced through one or more orifice plates, two of which are indicated at 13 and 21. The product under treatment is then forced into a manifold 22 disposed in a stable pressure tank 20 and caused under high pressure to pass through numerous mechanical vaporizing discharges 23 which completely vaporize and gasify the product under process of treatment. The thoroughly vaporized and gasified product finally condenses in the pressure tank 20 and becomes a composite product substantially homogeneous in character and of a predetermined specification and gravity which may be taken out through outlet 24.

I have shown in pipe A a meter 1 for indicating and registering the volume of a non-volatile liquid or gas or both liquid and gas passing to the pump, a check valve 2 to prevent backward flow, and a valve 3 to control the volume admitted to the pump. Similarly there is a meter 4 in line B to indicate and register the flow of another volatile or non-volatile liquid, a control valve 5 and a check valve 6. Check valves 9 and 11 are disposed respectively in the intakes and outlets of the pump cylinders 10 to provide for flow in the proper direction. The cylinders 10 are preferably of a double end pump, although a single pump may be used. 13 indicates generally the position of one of the orifice plates 15 in pipe section G—H. The orifice plate has a small central discharge orifice 15′ and is disposed between pipe flange couplings 14. Suitable gaskets 16 may be employed between the plate 15 and the flanges 14. 25 indicates a safety valve for relief of excess pressure in tank 20.

Suitable provision may be made in the apparatus for drawing samples and checking the product in process of treatment before and after leaving the pump as for example outlet valve connections similar to 19 disposed in the pipe H.

The process is conceived to operate either with or without heat. Ordinarily combinations will be effected at atmospheric temperatures but the pre-heating of certain of the less volatile or of non-volatile liquids when combining by this process with the gases or with liquids of a higher volatility will sometimes result in a more complete and harmonious combination than would result under ordinary atmospheric temperatures and the hot still gases may be effectively used in the process with liquids at atmospheric temperatures. The utility of my process and apparatus has been thoroughly proved and tested in practice.

My process can be carried out with an apparatus differently designed and constructed than illustrated in the accompanying drawings. The application of heat to any of the products to be treated may be effected in numerous ways before introducing them or any of them into the apparatus for treatment and the operation of the process itself may be varied considerably without leaving or departing from my invention.

Having thus described my invention, what I claim and desire to obtain by Letters Patent is:

In an apparatus for the treatment of hydrocarbon distillates and gases, the combination of a pair of pressure pump elements having their intakes leading to an impact chamber and their outlets leading to a second impact chamber, a pair of intake pipes with measuring and regulating devices therein leading to said first named impact chamber, a pressure condensing tank, a manifold therein having a plurality of pressure vaporizing nozzles or discharges, a pipe connection between the second impact chamber and said manifold and one or more orifice partitions in said pipe connection.

In testimony whereof, I have signed my name to this specification.

NICHOLAS H. COLWELL.